US009024786B1

(12) United States Patent
Jones et al.

(10) Patent No.: US 9,024,786 B1
(45) Date of Patent: *May 5, 2015

(54) SYSTEM FOR PROVIDING ENVIRONMENTAL CONDITION INFORMATION TO VEHICLES AND RELATED METHODS

(71) Applicant: Baron Services, Inc., Huntsville, AL (US)

(72) Inventors: Erick C. Jones, Madison, AL (US); Robert O. Baron, Sr., Huntsville, AL (US); Thomas S. Thompson, Athens, AL (US)

(73) Assignee: Baron Services, Inc., Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/331,949

(22) Filed: Jul. 15, 2014

Related U.S. Application Data

(63) Continuation of application No. 13/673,569, filed on Nov. 9, 2012, now Pat. No. 8,816,876, which is a continuation of application No. 12/037,265, filed on Feb. 26, 2008, now abandoned, which is a continuation of application No. 11/495,078, filed on Jul. 28, 2006, now Pat. No. 7,847,708.

(60) Provisional application No. 60/721,701, filed on Sep. 29, 2005.

(51) Int. Cl.
*G08G 1/09* (2006.01)
*G08G 1/0967* (2006.01)
*G01W 1/02* (2006.01)

(52) U.S. Cl.
CPC .............. *G08G 1/0967* (2013.01); *G01W 1/02* (2013.01)

(58) Field of Classification Search
CPC ..................... B60W 2550/12; B60W 2550/14; B60W 40/02; G05D 2201/02; G08B 27/00
USPC ............ 340/905, 539.13, 539.12, 601; 702/3
See application file for complete search history.

(56) References Cited

U.S. PATENT DOCUMENTS

| 4,153,881 A | 5/1979 | Permut et al. |
|---|---|---|
| 4,155,042 A | 5/1979 | Permut et al. |
| 4,575,750 A | 3/1986 | Callahan |
| 4,692,742 A | 9/1987 | Raizen et al. |

(Continued)

OTHER PUBLICATIONS

Lawrence J. Krudwig; Communicating Warnings and Safety Information to the Public; Dec. 1996?, USA.

(Continued)

*Primary Examiner* — Phung Nguyen
(74) *Attorney, Agent, or Firm* — Jeremy A. Smith; Stephen H. Hall; Bradley Arant Boult Cummings LLP

(57) ABSTRACT

An apparatus for communicating weather related information to a vehicle has been developed. The invention includes, a navigational positioning system that provides the location of the vehicle and a receiver for receiving weather related data at the vehicle that includes road conditions, atmospheric conditions, weather warnings and watches, and forecast conditions. The weather related data is associated with a geographic grid that is made of a plurality of cells. The invention's processor determines if the weather related data is associated with the vehicle location and displays the weather related data to the vehicle's occupants.

20 Claims, 8 Drawing Sheets

(56) References Cited

U.S. PATENT DOCUMENTS

| | | | |
|---|---|---|---|
| 5,001,471 | A | 3/1991 | Snowden et al. |
| 5,045,850 | A | 9/1991 | Andros et al. |
| 5,121,430 | A | 6/1992 | Ganzer et al. |
| 5,398,021 | A | 3/1995 | Moore |
| 5,481,254 | A | 1/1996 | Gaskill et al. |
| 5,548,323 | A | 8/1996 | Callahan |
| 5,555,446 | A | 9/1996 | Jasinski |
| 5,559,867 | A | 9/1996 | Langsenkamp et al. |
| 5,790,953 | A | 8/1998 | Wang et al. |
| 5,862,244 | A | 1/1999 | Kleiner et al. |
| 5,912,947 | A | 6/1999 | Langsenkamp et al. |
| 5,949,851 | A | 9/1999 | Mahaffey |
| 5,990,805 | A | 11/1999 | Wicks et al. |
| 6,112,015 | A | 8/2000 | Planas et al. |
| 6,295,001 | B1 | 9/2001 | Barber |
| 6,463,273 | B1 | 10/2002 | Day |
| 6,490,525 | B2 * | 12/2002 | Baron et al. ............... 702/3 |
| 6,597,990 | B2 | 7/2003 | Brown |
| 6,603,405 | B2 * | 8/2003 | Smith ..................... 340/905 |
| 6,836,239 | B2 * | 12/2004 | Scott ...................... 342/176 |
| 6,920,204 | B1 | 7/2005 | Tuttle |
| 7,609,819 | B1 | 10/2009 | Tuttle |
| 7,949,330 | B2 * | 5/2011 | Yuhara et al. ........ 455/414.3 |
| 2004/0043760 | A1 * | 3/2004 | Rosenfeld et al. .... 455/414.3 |

OTHER PUBLICATIONS

SBE Daily News, Lawrence J. Krudwig; Weather Radio Specific Area Message Encoder; Oct. 5-8, 1989, National Convention and Broadcast Engineering Conference, Kansas City, MO.

Emergency Communications Administration; Amendment of Part 73—Rules Regarding the Emergency Broadcast System; Dec. 9, 1994, Washington, D.C.

U.S. Department of Commerce, NOAA National Weather Service; Memo to All Holders of Operations Manual, WSOM Chapter C-63, NOAA Weather Wire Service Dissemination, Dec. 1, 1989. Silver Spring, MD.

U.S. Department of Commerce, NOAA National Weather Service; Memo to All Holders of Operations Manual, Revised Chapter C-66, Dissemination, of Public Warnings, Aug. 10, 1979, Silver Spring, MD.

National Weather Service Operations Manual, Nov. 27, 1970, USA.

U.S. Department of Commerce, NOAA National Weather Service; Memo to All Holders of Operations Manual, Revised Chapter G-20, NOAA Weather Wire Service (NWS); May 1, 1989, Silver Spring, MD.

Hollyanne Corp., Hollyanne Press Conference, Apr. 30, 1988, Los Angeles, CA.

\* cited by examiner

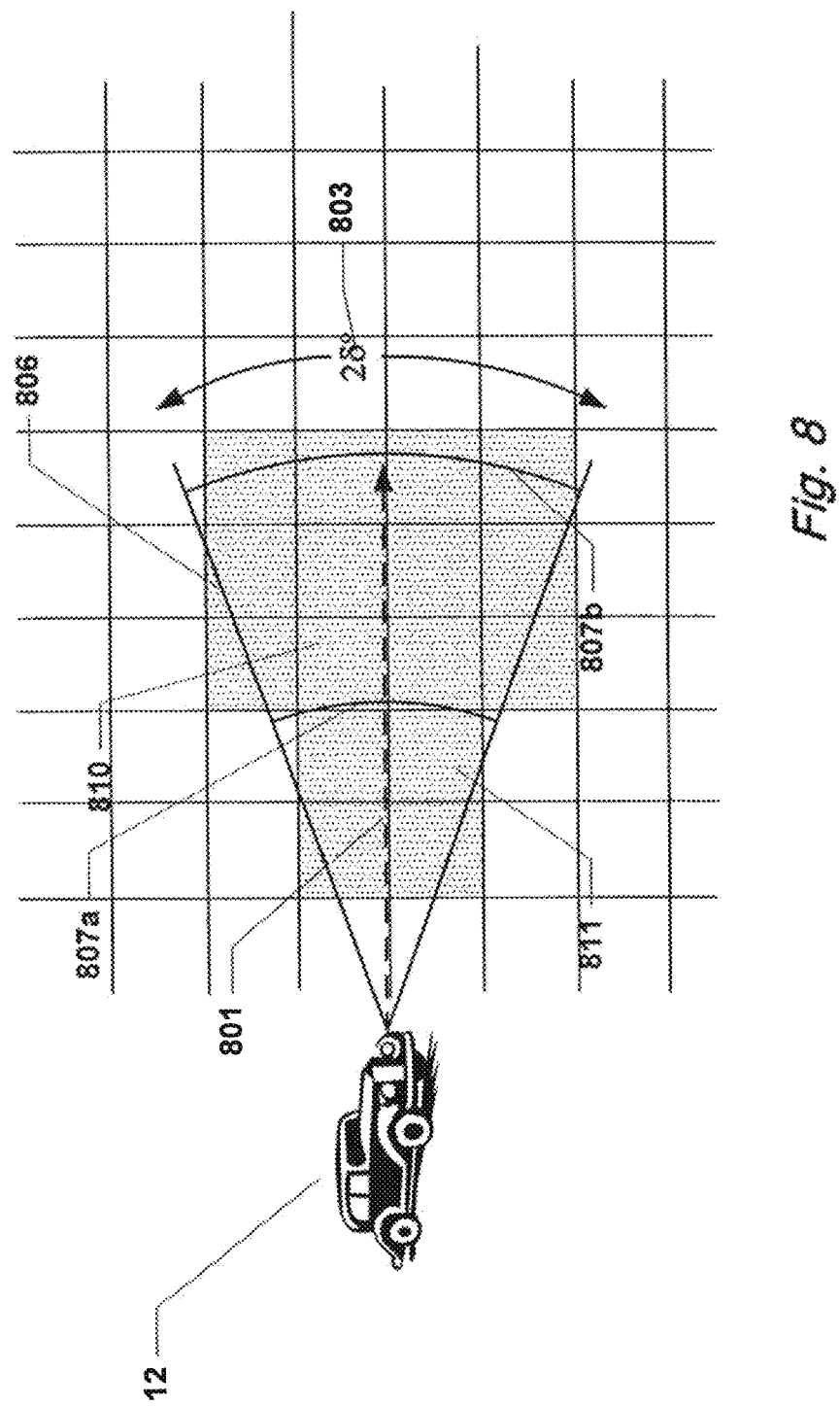

SYSTEM FOR PROVIDING ENVIRONMENTAL CONDITION INFORMATION TO VEHICLES AND RELATED METHODS

CROSS-REFERENCE TO RELATED APPLICATIONS

This application is a continuation of, and therefore claims the benefit of and priority to, U.S. patent application Ser. No. 13/673,569, that was filed on Nov. 9, 2012, which was a continuation of, and therefore claimed the benefit of and priority to, U.S. patent application Ser. No. 12/037,265 that was filed on Feb. 26, 2008, which is a continuation of, and therefore claimed the benefit of and priority to, U.S. application Ser. No. 11/495,078, now U.S. Pat. No. 7,847,708, that was filed on Jul. 28, 2006, which claims priority to and the benefit of U.S. Provisional Application No. 60/721,701 that was filed on Sep. 29, 2005, all of which are incorporated by reference herein.

FIELD OF THE INVENTION

The present invention relates generally to the distribution of environmental condition information to vehicles, and particularly, the distribution of real-time and site-specific alert information.

BACKGROUND ART

The importance of weather reporting and forecasting in our daily lives cannot be contested. A large percentage of the people in the United States watch their local evening news on a nightly basis to see the local weather report and forecast. This information may then used to make decisions regarding what to wear, what to do, and, in travel, where and when it is safe to travel. Under certain circumstances, such as in the case of severe weather, some people may find themselves in situations where they are making life and death decisions based upon the weather information they have available to them.

This information is particularly important to travelers on the road, on the water or in the air. Severe weather may arise abruptly, giving the traveler very little warning and few options for safe travel. For cars and trucks, road conditions change as a result of weather events such as rain or sleet.

Travelers may obtain weather data reported by television stations or networks prior to their journeys and plan accordingly. Local television stations, as well as the national networks, obtain weather data from the National Weather Service (NWS) which maintains a network of radar installations located at approximately one hundred thirty-eight sites throughout the United States. Observers at each of these installations monitor the weather conditions within their area and provide hourly teletyped messages to subscribers, typically through a third party weather service provider such as GTE Contel, a subsidiary of GTE Government Systems. In addition, other services provide lightning strike information on a subscription basis, such as through Global Atmospherics, Arizona, U.S.A.

The weather information provided by any one or a combination of the above services may be synthesized at a local television station into an understandable format for presentation to the public. In general, the meteorological data is gathered at the local television station and combined with image maps of a geographical region to generate a weather image, i.e., a graphical illustration of the weather. In addition, the local temperatures for various communities or cities within the viewing area of the station may also be generated on the weather image. A sequence of these composite weather images can be looped to create weather animation. The local television station may then broadcast the weather images to viewers.

Although the current weather reporting and forecasting systems used by television stations and networks have much benefit, they may not provide relevant weather information during severe weather, or when weather manifests differently than forecasts. In such circumstances the weather forecasts obtained prior to traveling are rendered useless. This is particularly true when it comes to the existence of severe weather which arises quickly without much warning, as is often the case with tornadoes. It is well known that tornadoes and other types of severe weather can strike quickly without much prior notice. The information provided by the television stations and networks regarding these types of severe weather are seldom provided in a real-time fashion and are generally not detailed as to the specific location or direction of the weather front. Therefore, travelers are often not given sufficient warning to adequately prepare for the weather in order to protect their property or find a safe refuge for themselves.

Travelers may obtain weather warnings from a radio broadcast from a car radio, if the radio is on and tuned to the proper station. Moreover, the weather information that is provided is often provided on a county wide basis which, depending on the size of the county, the actual path of the severe weather through a county, and the position of the listeners within the county, may be irrelevant.

An alternative source of weather information is through weather radios such as the Realistic Weather Radio Alert III, Model No. 12-140, distributed through "Radio Shack," a division of the Tandy Corporation. In general, weather radios may provide listeners with prerecorded or live weather updates on an essentially continuous basis. The weather radios receive the weather information updates which are broadcasts by the national Weather Service (NWS) from local transmitters using specific frequencies designated by the Federal Communication Commission (FCC). The weather updates usually comprise regular weather information which is prerecorded and then broadcast, except for the issuance of severe weather watches or warnings. In those cases, a prerecorded (or sometimes live) watch or warning message is preceded by a tone (e.g., a 1,000 cycle tone) that is manually activated at the broadcast station. The tone weather radios that are turned on and within the range of the broadcasted signal may receive the tone which activates an audible alarm on the radio. The audible alarm is typically not distinctive as to whether it represents a watch and warning, nor does the audible alarm indicate the type or severity of the severe weather. The alarm will usually continue until the user pushes an alert key or button on the weather radio. It is noted that NWS personnel are responsible for both manually recording of the audio messages for broadcast and the manually activating of the tone. However, most automobiles are not equipped with such devices.

Real-time, site-specific distribution of weather information has been described previously in co-owned U.S. Pat. No. 6,018,699, issued Jan. 25, 2000; U.S. Pat. No. 6,275,774, issued Aug. 21, 2001; U.S. Pat. No. 6,493,633, issued Dec. 10, 2002; and U.S. Pat. No. 6,490,525, issued Dec. 3, 2002. Those references teach a remote unit that receives information from the distribution network and provides an alert to the user. In some embodiments, the remote units are mobile units and provided with some programming to allow the remote unit to determine based upon input from a global positioning system (GPS) whether information is relevant to it. Weather data is received by a server system which encodes the data into a database in the form of a grid where grid cells are associated with geographic areas. This database is transmitted over a distribution network which could be over a cellular network, a land line network, a satellite network or any combination thereof, where eventually it is received by the remote units which decode the data. In some embodiments, remote units may include programming that allows the remote unit to interpret and display data. Such systems find use with emergency response personnel and similar organizations that may be able to afford such equipment.

Such remote units might be costly and complex for use in cars owned and operated by the average consumer. Nevertheless, drivers on the road still need the information while they are traveling. Moreover, because of the need to focus one's attention on the road, the information presented to the driver must be succinct and provide the driver with only the information he or she needs. In other words, the system must alert the driver to conditions and require the driver to perform any interpretation of data. To solve this problem, remote units are designed to perform some, if not all, of the weather interpretation functions to display and alert the user in the most concise manner possible, either through visual or aural cues. This requires a complex device to enable the remote unit to perform this function.

There are vehicles being marketed today that are equipped with GPS-responsive navigation systems. Such systems provide geo-location information as well is vehicle motion data. Vehicles are also being marketed with satellite radio receivers that allow users to receive signals distributed by a satellite distribution network. A system may be implemented which integrates these two systems and provides real-time, site-specific alerts to travelers, while at the same time avoiding cost and complexity of more robust weather messaging systems. Such a system could be also be achieved by integrating a suitably enabled stand-alone device with existing navigation and satellite radio systems.

SUMMARY OF THE INVENTION

In some aspects, the invention relates to an apparatus for communicating weather related information comprising: a navigational positioning system that provides the location of a vehicle; a receiver for receiving weather related data at the vehicle, where the weather related data comprises, road conditions, atmospheric conditions, weather warnings and watches, and forecast conditions, where the weather related data is associated with a geographic grid comprised of a plurality of cells; a processor that determines if the weather related data is associated with the vehicle location; and a display device that displays the weather related data associated with the vehicle location.

In other aspects, the invention relates to a system for receiving and processing environmental information related to a vehicle comprising: a receiver configured for receiving data associated with a plurality of grid cells, where the data comprises weather conditions, road conditions, and weather warnings and watches in said plurality of grid cells; means for providing a geographic position of said vehicle; and a computer system having a memory configured with processor-readable instructions to cause said computer system to receive the geographic position of the vehicle and determine if the received data associated with a plurality of grid cells is relevant to said geographic position of said vehicle.

In other aspects, the invention relates to an apparatus for communicating weather related information comprising: means for determining the location of a vehicle; means for receiving weather related data associated with a geographic cell grid, where the weather related data comprises at least two of meteorological data, road condition data, road status data, and traffic data; and means for processing the weather related data based on the location of the vehicle to determine the relevant weather related data to an end user; and means for displaying the relevant weather related data to the end user.

In other aspects, the invention relates to an apparatus for communicating weather related information comprising: a global positioning system (GPS) that provides the location of an automobile based on the automobile's current latitude and longitude; a satellite radio receiver for receiving weather related data associated with a geographic cell grid at the automobile, where the weather related data comprises, threatening road condition data, threatening atmospheric condition data, National Weather Service (NWS) weather warning and watch data, and current and forecast weather condition data; a microprocessor that filters the weather related data based on the location of the vehicle and stored preferences to determine the relevant weather related data associated with the vehicle's present location and the vehicle's anticipated future location; and a visual display device that displays the relevant weather related data associated with the vehicle location In other aspects, the invention relates to a system for providing weather related data to mobile users, comprising: a central processor that receives, processes and stores weather related data comprising, meteorological data, and road status data; a data distribution network that provides weather related data to multiple mobile users; and where the weather related data is formatted to allow sorting to determine relevant weather related data based on the mobile users location.

In other aspects, the invention relates to a computer system for providing environmental information to one or more mobile remote users comprising: a memory configured with processor-readable instructions to execute a method comprising, receiving environmental data, said environmental data being at least two of meteorological data, road condition data, road status data, and traffic data; processing the environmental data based on a geographic grid template comprising a plurality of cells, to determine which of the cells are affected by the environmental data; assigning an indicator to the plurality of cells of the geographic grid representing the environmental data associated with the plurality of cells, where the indicator represents at least two of meteorological conditions, road conditions, road status conditions, or traffic conditions; and outputting said assigned indicator to a distribution network for distribution to one or more remote mobile users.

In other aspects, the invention relates to a method for providing environmental information to one or more mobile remote users comprising: step for receiving environmental data selected from at least two of the group comprising meteorological data, road condition data, road status data, and traffic data; step for processing the environmental data based on a geographic grid template comprising a plurality of cells, to determine which of the cells are affected by the environmental data; step for assigning a status indicator each of the cells that represents the conditions of that cell based on the environmental data; and step for outputting the status indicator to a distribution network for distribution to one or more remote mobile users.

Other aspects and advantages of the invention will be apparent from the following description and the appended claims.

BRIEF DESCRIPTION OF DRAWINGS

It should be noted that identical features in different drawings are shown with the same reference numeral.

FIG. 8 is a diagram illustrating an exemplary method used by the remote system decoder in providing forecast, site-specific environmental condition information.

DETAILED DESCRIPTION

The various embodiments of the present invention and their advantages are best understood by referring to FIGS. 1 through 8 of the drawings. The elements of the drawings are not necessarily to scale, emphasis instead being placed upon clearly illustrating the principles of the invention. Throughout the drawings, like numerals are used for like and corresponding parts of the various drawings.

As used herein the term "device" is intended to mean a single piece of equipment, contained with a single housing. The term "system" is intended to mean a collection of components (which may be apparatuses, devices, or subsystems) that communicate or interoperate with one another to accomplish a function or set of functions. A system may be distributed or by contained within a "device."

Furthermore, reference in the specification to "an embodiment," "one embodiment," "various embodiments," or any variant thereof means that a particular feature or aspect of the invention described in conjunction with the particular embodiment is included in at least one embodiment of the present invention. Thus, the appearance of the phrases "in one embodiment," "in another embodiment," or variations thereof in various places throughout the specification are not necessarily all referring to its respective embodiment.

With this in mind, this invention may be provided in other specific forms and embodiments without departing from the essential characteristics as described herein. The embodiments described above are to be considered in all aspects as illustrative only and not restrictive in any manner. The appended claims rather than the foregoing description indicate the scope of the invention.

Figure 1:
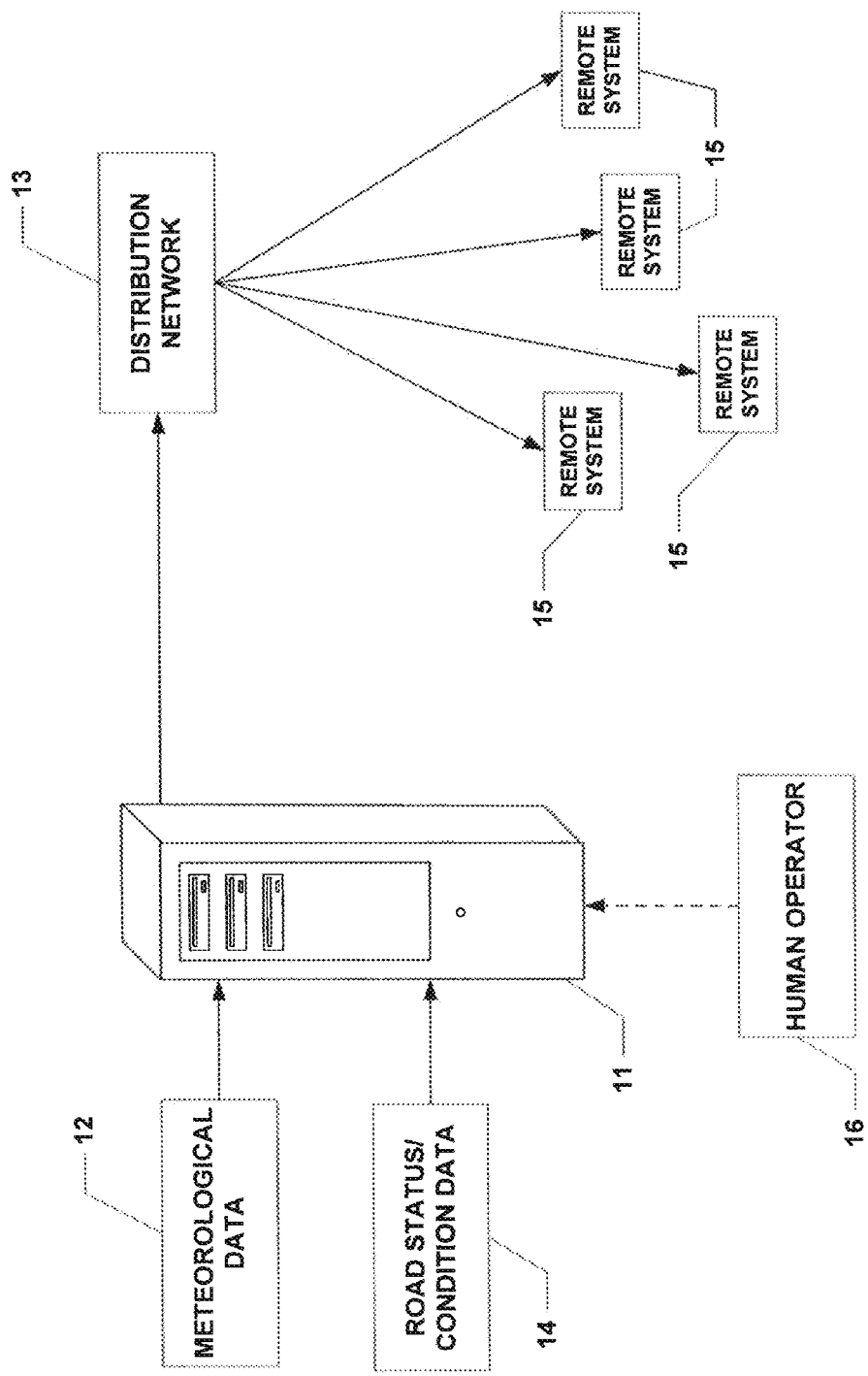
FIG. 1 is a functional diagram of the system architecture according to an embodiment of the present invention.

Referring now to FIG. 1, a system for providing real-time site specific weather information in accordance with the present invention is illustrated. The system 10 comprises a matrix encoder 11 in communication with distribution network 13. In turn distribution network 13 is in communication with one or more remote systems 15. Matrix encoder 11 receives meteorological data 12 from a variety of sources including weather information for a geographic area which is relevant to one or more of the remote systems 15. Matrix encoder 11 may also receive road status or road condition data 14 for a geographic area relevant to one or more remote systems 15. The various data 12, 14 are processed by matrix encoder 11 to construct a threat matrix which is a compilation of interpreted weather and road condition and status data and transmit the threat matrix to one or more remote systems 15 over distribution network 13. Remote systems 15 process the received threat matrix to provide weather or road condition alerts to users traveling in, or about to travel in, the geographic area affected, or may be affected by such weather or road conditions.

Figure 2:
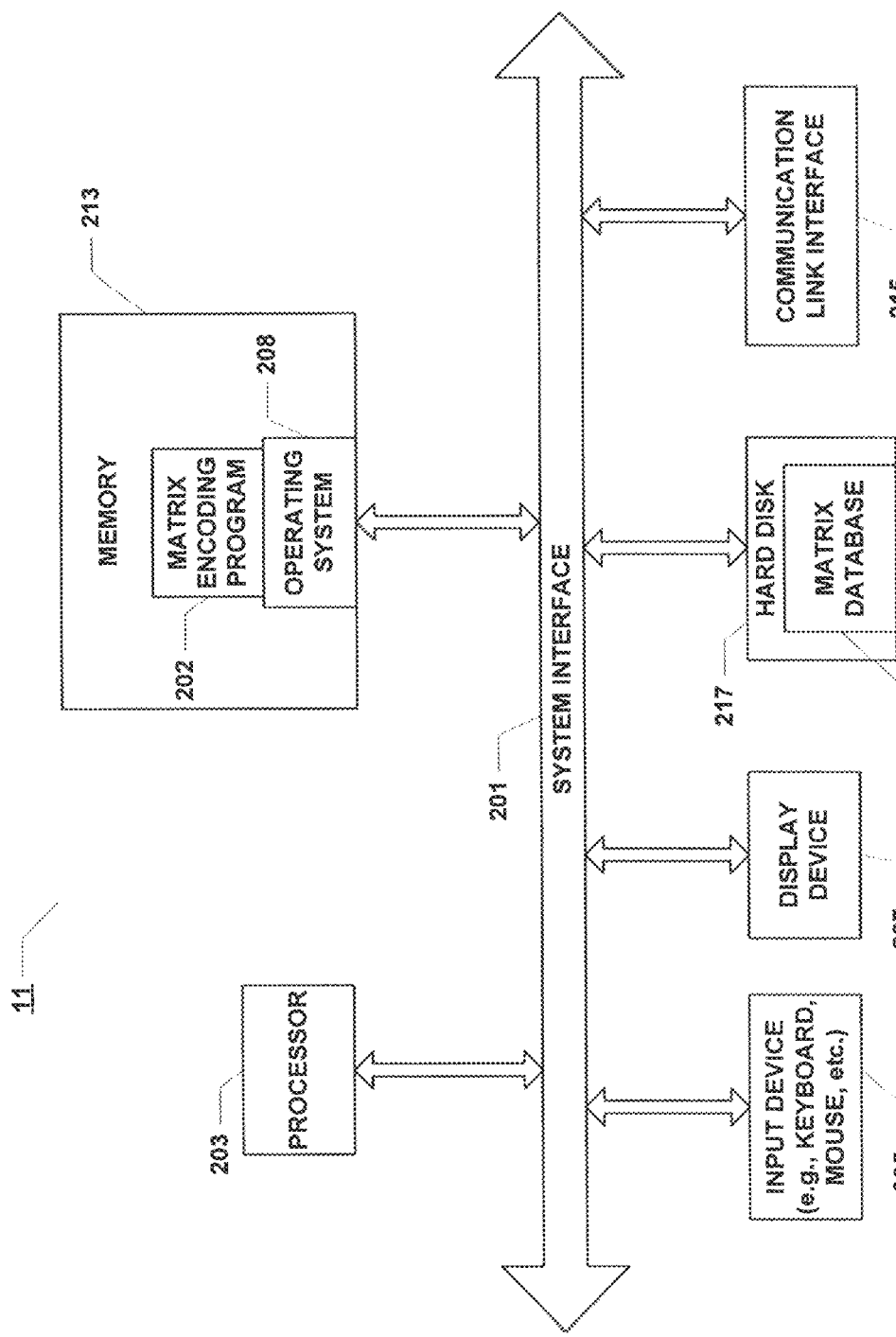
FIG. 2 is a functional diagram of an matrix encoder according to an embodiment of the present invention.

An illustration of an exemplary matrix encoder 11 is provided by the functional diagram of FIG. 2. Exemplary matrix encoder 11 includes encoding program 202 in accordance with the present invention. As shown, the matrix encoder 11 is preferably configured as a special purpose computer or other apparatus suitable for executing the program code embodied within the encoding program 202 so as to impart the functionality described herein and those other functionalities necessary for the operation of the present invention as would be apparent to one of ordinary skill in the art. The matrix encoder 11 further includes a processor 203 that can communicate with the other elements within the matrix encoder 11 via system interface 201. An input device 205, for example, a keyboard or mouse, is used to input data from a user, and a screen display device 207, for example, a monitor, is used to output data to the user. A memory 213 within the matrix encoder 11 contains the encoding program 202 for imparting the functions described herein. In addition, the memory 213 includes a conventional operating system 208 that communicates with the encoding program 202 and enables execution of the encoding program 202 by the processor 203. A communication link interface 215 is provided for interfacing the matrix encoder 11 with other related systems for purposes such as receiving meteorological data and road status data, or transmitting status matrix to the distribution network 13. Lastly, a hard disk 217 may be provided as a nonvolatile memory for storing information such as a matrix database 212 as described in more detail below. It will be appreciated by those skilled in the art that matrix encoder 11 may be also achieved by using a cluster of two or more computers in communication, as may be necessary to handle the data.

Matrix encoder 11 is configured to receive meteorological data and road status/road condition data via communication link interface 215, or alternatively, via manual input through input device 205. Meteorological data 12 include data on weather phenomena that are of interest to travelers. Non-limiting examples of such data are lightning strike locations, precipitation observation data, precipitation forecasts, hail, visibility, cloud cover, wind data, wind shear, storm warnings, flood warnings, and snow data. Those skilled in the relevant arts will appreciate that such data may be obtained from a variety of sources. Some non-limiting examples of meteorological data sources include, the National Oceanic & Atmospheric Administration (NOAA) via its NOAAport, National Weather Service (NWS), National Lightning Detection Network, the Rapid Update Cycle (RUC) model available from the National Centers for Environmental Prediction (NCEP). These data are available over an electronic communications network using suitable transfer protocols, e.g., file transfer protocol, or the like, and may be automatically retrieved by matrix encoder 11 which is configured with control logic to cause encoder 11 to execute that function. Alternatively, other processors may be configured with control logic to retrieve the required data, collate the data into a format and transfer that data to matrix encoder. Matrix encoder 11 is preferably adaptable to accept and process data in whatever format may be available from any source of meteorological or road data, currently existing or hereafter developed.

Road status data 14 includes, without limitation, road closings and openings, whether a road is under construction, or repair. Presentation of information from this data allows users to plan alternate routes. These data are available from the Federal and state departments of transportation, municipal and county public works, and the American Automobile Association (AAA). Also an electronic communications network may be used to automatically retrieve road status data in a manner similar to that used to retrieve meteorological data.

Road condition data relates to whether there may be ice, water, or other substances on a road that present a hazard to safe driving. This data may be generated by control logic in matrix encoder 11. For example, if an area experiences rain, matrix encoder may be configured to indicate that the roads in that area are wet. Similarly, if meteorological data show that temperatures in an area are below freezing and that the area has had or will experience precipitation, matrix encoder may be configured to also indicate that the roads are icy. In addition, road condition data may be provided by observation and automatically retrieved via communication link interface 215. Similarly, those skilled in the arts will appreciate that traffic alert data may also be obtained from a variety of sources.

It should be noted that an optional human operator 16 may also manually input both meteorological data and road status/condition data, as well as enter adjustments or correction to the received data in the case that retrieved data is inconsistent or in error. This may be achieved through input device 205.

The data are received by or input into the matrix encoder 11 and processed in accordance with control logic comprising matrix encoding program 202. Specifically, meteorological data, including measurements, observations, and forecasts, along with locations, and forecast locations of events, are retrieved and control logic within matrix encoding program 202 is configured to render "presence" decisions based upon predefined criteria.

Matrix encoding program 202 is also configured to construct a grid comprising a plurality of cells each of which are associated with a segment of the land area throughout which the real-time weather alert messages are to be distributed. Each cell is preferably referenced or identified by at least one latitude coordinate and one longitude coordinate within the cell. In one exemplary embodiment of the present invention, cell reference coordinates are the geographic points at which the centers of the cells are overlayed. In another embodiment, the reference coordinates are any of the corners of the cells. In a further embodiment, the reference coordinates may be the midpoints of the cell boundaries. It will, thus, be apparent to those skilled in the relevant art that the cells may be identified by any coordinate within the cell.

Figure 5A:
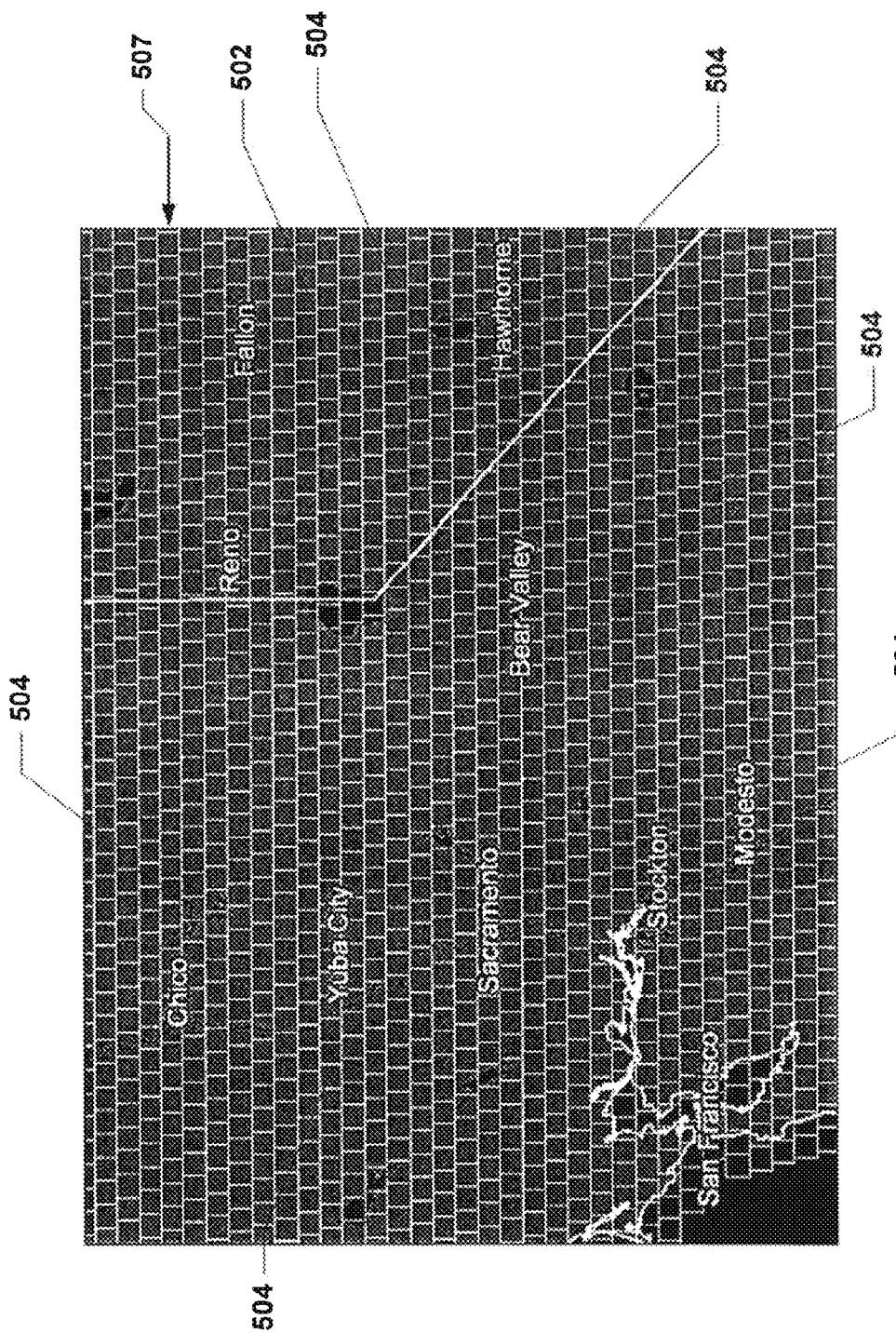
FIG. 5A is an illustrative screen capture of a computer graphic depicting an exemplary grid overlaying a geographic area.

The size of the cells can be defined by the user, depending upon the degree of information resolution desired. In one embodiment, for example, cells may be 10 km×10 km. An exemplary grid structure is shown in FIG. 5A wherein a Platte-carre projection of a geographic area 501 is overlayed with a grid 502 comprising a plurality of cells 504. Platte-carre projection lines of latitude and longitude are shown as straight and are evenly spaced. The cells 504 comprising the exemplary grid are ordered according to rows 507, which correspond to lines of latitude. Thus, all cells in a row have the same latitude from column to column. Those skilled in the art will also appreciate that the grid may be implemented by ordering cells along lines of longitude, or columns, as well.

In either case, it is preferable to keep cells 504 at a uniform size, so account must be taken of the longitude in constructing the grid since distance between lines of longitude decreases with increasing latitude values. For example, in one embodiment where the grid cells are ordered along lines of latitude, cell longitudes vary from row to row so that corresponding cells in differing rows are laterally offset with respect to each other (See FIG. 5A) presenting a "slanted column." In this case where the grid is ordered according to rows, columns of longitude may be converted from an x-coordinate with a multiplier specific to the row that may be calculated by a formula every time a cell is accessed, or the multiplier may be provided in a look-up table.

Figure 5B:
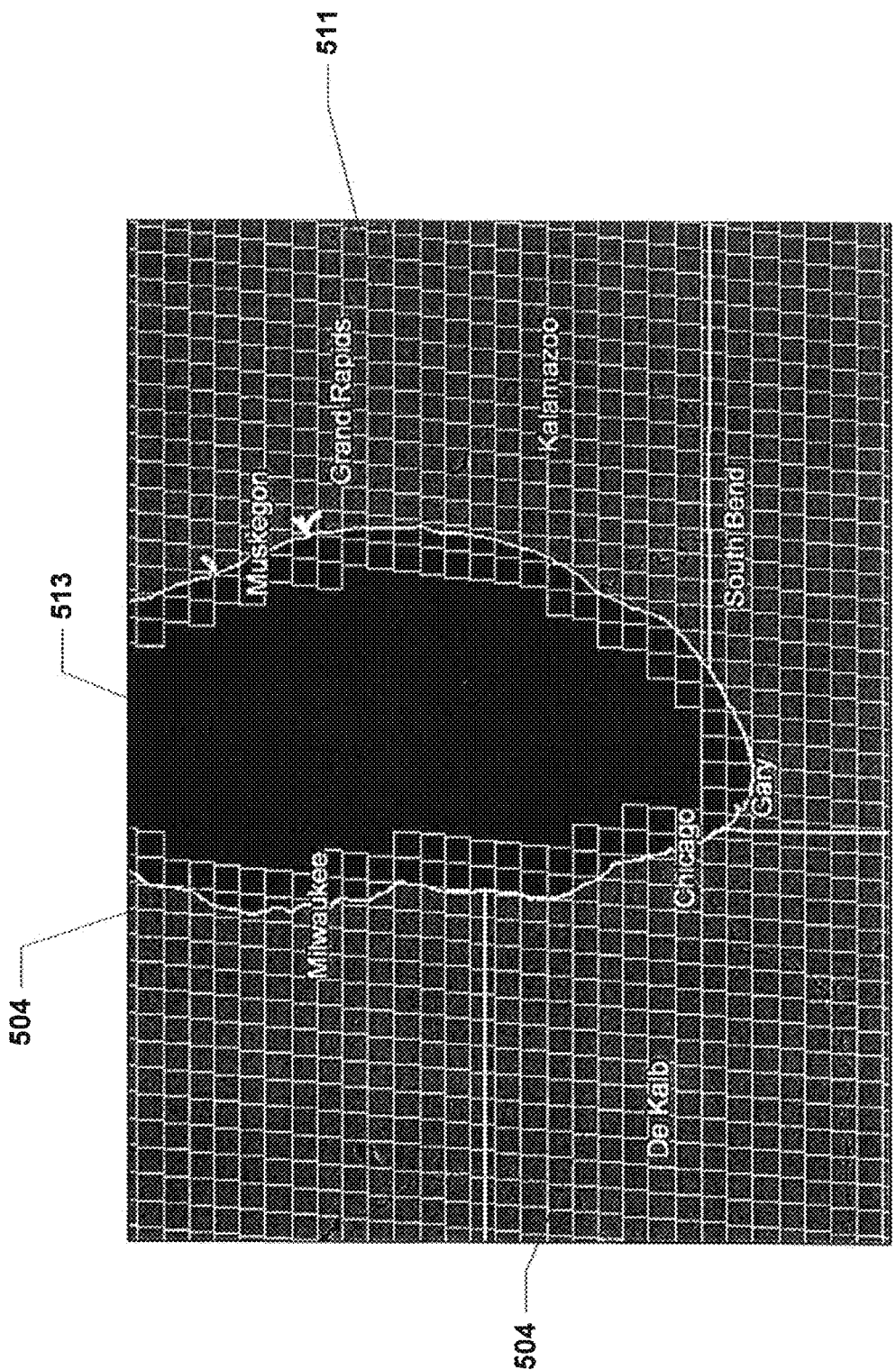
FIG. 5B is an illustrative screen capture of a computer graphic depicting an exemplary grid overlaying a geographic area wherein matrix cells are not defined for a body of water.

In another embodiment, it may be desired to decrease the size of the database. In applications that do not require or desire information to be transmitted to water-borne vessels, cells do not need to be defined for areas comprising bodies of water greater than 100 sq. miles. FIG. 5B illustrates a notional grid 511 overlaying an area that includes such a body of water 513.

By comparing the coordinates defining the locations and predicted path of the meteorological phenomena to the grid on a cell by cell basis, each cell within the matrix that is affected by the phenomena can be identified. Furthermore, matrix encoding program 210 may be configured with control logic to determine "presence" indicators for the identified cells that the phenomena affect at the current time, and that the phenomena will affect in some future time. Presence indicators are simply characters that indicate the presence of meteorological phenomena in a cells according to a predetermined legend, an example of which is discussed in greater detail below. A presence indicator may also contain "characteristic" information indicating the intensity or severity, or duration of the event. Each cell is associated with one or more presence indicators. The grid cells combined with the meteorological phenomena presence information associated with identified cells comprise a threat matrix. The threat matrix may be a database as would be appreciate by those skilled in the arts.

In one exemplary embodiment, meteorological phenomena are associated with grid cells in the following manner. Each cell includes 32 bits of data. These 32 bits are divided into fields representing the different meteorological phenomena that might exist. Each field may be 1, 2, or 3 bits long depending on how many values are desired to encode for a given field. Table 1 below shows a non-limiting example of a scheme for distributing bits among the fields. Bit 0 is the least significant bit, and bit 31 is the most significant bit.

TABLE I

Exemplary matrix cell definition

| BITS | FIELD |
| --- | --- |
| 0-2 | Precipitation |
| 3 | Hail |
| 4-5 | Visibility |
| 6-7 | Storm path |
| 8-9 | Wind |
| 10-11 | NWS flood watch/warning |
| 12-13 | NWS thunderstorm |
| 14-15 | NWS tornado watch/warning |
| 16 | Snow accumulation |
| 17-18 | Forecasted precipitation |
| 19 | Lightning |
| 20 | Icy roads |
| 21 | Road closings |
| 22-31 | Miscellaneous |

The precipitation field represents current precipitation. In this example, the field comprises three bits with at least six possible values to represent. Possible values include: 0 (No precipitation); 1 (Light rain); 2 (Heavy rain); 3 (Mixed precipitation (including ice)); 4 (Light snow); and 5 (Heavy snow).

The hail field is only one bit and if this bit is set, then the cell is under threat of severe hail. In this embodiment, this could represent hail that is currently detected in the cell, or it could indicate that a severe hail storm is approaching the cell. To determine which is the case, the value of the Storm path field must be examined as will be described below.

The next field indicates the visibility within the cell. In this embodiment possible values may be: 0 (Visibility un-obscured by weather); 1 (Fog); 2 (Heavy fog); and 3 (Very low visibility).

Storm path field is used to indicate whether a convective storm (as may be identified by a SCIT) is located within the cell boundaries, or, if not present in the cell, how soon the storm will arrive at the cell. Possible values may be as follows: 0 (No storm); 1 (Storm in 20 minutes); 2 (Storm in 10 minutes); 3 (Storm present).

The Wind field serves a dual role in this embodiment. If a convective storm with twisting wind is approaching a given cell, this field is set to 3 and the expected time of arrival is encoded in the Storm Path field. Otherwise, this field is used to indicate current wind strength in the cell. Possible values in this field may be as follows: 0 (Calm or moderate wind); 1 (High winds); 2 (Dangerous winds); 3 (Twisting storm approaching (i.e., a convective storm with a significant amount of wind shear detected)).

It should be noted, that in this example, the Storm path field is preferably examined in conjunction with the Hail field and the Wind field, because the latter two fields can indicate the type of storm that is approaching the cell. For example, if the Hail field is set to 1 and the Storm path field is set to 2, then a hail storm is expected to arrive in the cell in 10 minutes. If the Wind field is set to 3 (which is defined as "twisting wind") and the Storm Path field is set to 1, then a storm with dangerously twisting wind is expected to arrive in 20 minutes. It will be appreciated that because both types of storm use this one field to indicate their arrival time, some information could be lost in this embodiment. For example, if a hail storm is currently in the cell and a twisting storm will arrive in 20 minutes, the Storm Path field will contain the value 3 because of the hail storm, and the cell will not be associated with the twisting storm that is 20 minutes away, and that alert may not be provided by the remote system. In such cases, the remote system should be configured to "assume the worst", i.e., that both the hail storm and the twisting storm are nearby.

In this example, only the "twisting wind" value (numeric value of 3) in the Wind field represents a convective storm whose arrival time is indicated in the Storm Path field. If the Wind field contains a value other than 3, then that only reflects current wind conditions within the cell, and the Storm Path field will have a value of zero unless the Hail field is set. Also, it should be noted that a "twisting storm" is not necessarily a tornado. Whether a tornado is present, or may be present sometime in the future, is derived from NWS watch or warning data as described below.

The Flood watch/warning field is used to indicate that the cell is within (or includes some portion of) a county, or other geo-political division that is under a flood watch or warning. Possible values include: 0 (No watch or warning); 1 (flood watch); 2 (flood warning). Similarly, the Thunderstorm watch/warning field may be used to indicate that the cell is within (or includes some portion of) a county, or other geo-political division, that is under a thunderstorm watch or warning. Possible values include: 0 (No watch or warning); 1 (thunderstorm watch); and 2 (thunderstorm warning). And finally, the Tornado watch/warning field is used to indicate that the cell is within (or includes some portion of) a county, or other geo-political division, that is under a tornado watch or warning. Possible values may be: 0 (No watch or warning); 1 (tornado watch); and 2 (tornado warning).

The Snow accumulation field indicates that there is an accumulation of snow on the ground within the cell. This does not necessarily imply that it is currently snowing in the cell. This field can have two possible values, 1 for some amount of snow accumulation and 0 for no snow accumulation.

The forecasted precipitation field is used to indicate expected precipitation between current moment and some fixed amount of time in the future. Possible values may be as follows: 0 (No precipitation anticipated; 1 (Rain forecast); 2 (Mixed precipitation forecast); and 3 (Snow forecast).

The next three fields in this embodiment may be each one bit in size which simply indicates presence or no presence. The Lightning field is set to 1 if a lightning strike has been detected within the cell in the last 10 minutes, and 0 otherwise. The Icy roads field is set to 1 if an icy road hazard exists within the cell, and 0 otherwise. Last, the Road closings field is set to 1 if some roads within the cell are closed due, 0 otherwise. The remaining bits may be used for, as the field suggests for any other information, or additional weather phenomena categories.

It will be understood that the field definitions described above are non-limiting. The fields could represent any aspect of meteorological data, road condition data, road status data or traffic data. For example, fields could be designed to indicate current or forecasted wind shear events, temperature extremes, slippery road conditions, or any other similar events or conditions.

It will be appreciated by those skilled in the relevant arts with the benefit of reading this disclosure that the above described system and method obtains meteorological data, analyzes it, and determines whether a given category of meteorological phenomena affects or will affect a specified geographic area. The resulting output is simply a yes or no message, and perhaps an indication of the severity or duration with which phenomena affect an area. Thus, the matrix encoder interprets the significance of weather phenomena for a geographic area, which results in a reduced processing and memory requirement for the receiving remote systems. This also advantageously reduces bandwidth required for the transmission of the information over the distribution network 13.

Once the matrix is encoded, it is then conveyed in a data stream to the remote systems via the distribution network. Matrix encoder 11 constructs matrix messages associated with the threat matrix that are communicated to distribution network 13. The matrix data may be transmitted to distribution network 13 in a variety of formats. However, it is preferable to reduce processing and software requirements, and thus cost and complexity, of the remote systems. Therefore, it is preferable to further reduce the data that the remote systems are required to receive and process.

Figure 3:
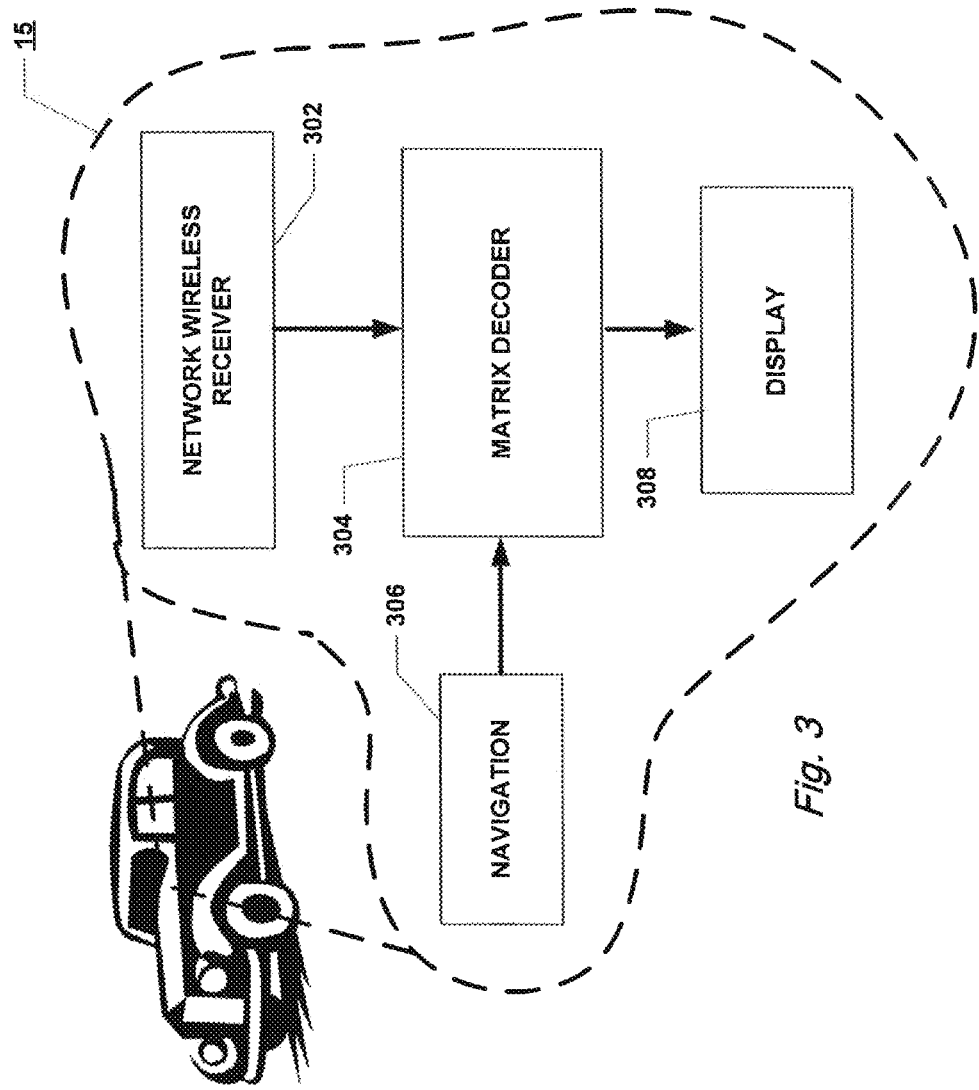
FIG. 3 is a functional diagram of a remote system according to an embodiment of the present invention.

With reference to FIG. 3, an exemplary remote system 15 includes wireless network receiver 302 and navigation device 306 both communicating with matrix decoder 304 which in turn controls display device 308. Wireless network receiver 302 can be implemented with a radio receiver that is configured to receive and decode signals transmitted via a wireless network. In one embodiment the wireless network is a satellite radio network, for example, networks conducted by XM Satellite Radio, Inc. or Sirius Satellite Radio, Inc. In such case, wireless network receiver 302 is configured to receive, decode and demodulate signals that are transmitted over such networks according to that networks communication protocols, as would be understood by those skilled in the arts. Wireless network receiver 302 receives and decodes the network signals carrying matrix data messages and relays the messages to matrix decoder device 304.

It should be noted that distribution network 13 also can be implemented by a variety of different communication mediums such as, but not limited to, wireless (including cellular, WiFi, 802.15, Bluetooth®, and the like), cable television, pager, land-line telephone, cellular telephone, etc. It would be apparent to skilled artisans that in those embodiments where distribution network is not a wireless network, wireless network receiver would be an appropriate land-line counterpart (e.g., modem), or eliminated, depending upon the network communications protocols.

Navigation device 306 is a device that calculates its geographic position and can also provide the speed and direction of travel of the remote system 15. Navigation device may be implemented 306 with a Global Positioning System (GPS) device or other suitable device, e.g., an inertial navigation computing system. Navigation device 306 provides geographic position of the remote system 15 to matrix decoder 304.

Figure 4:
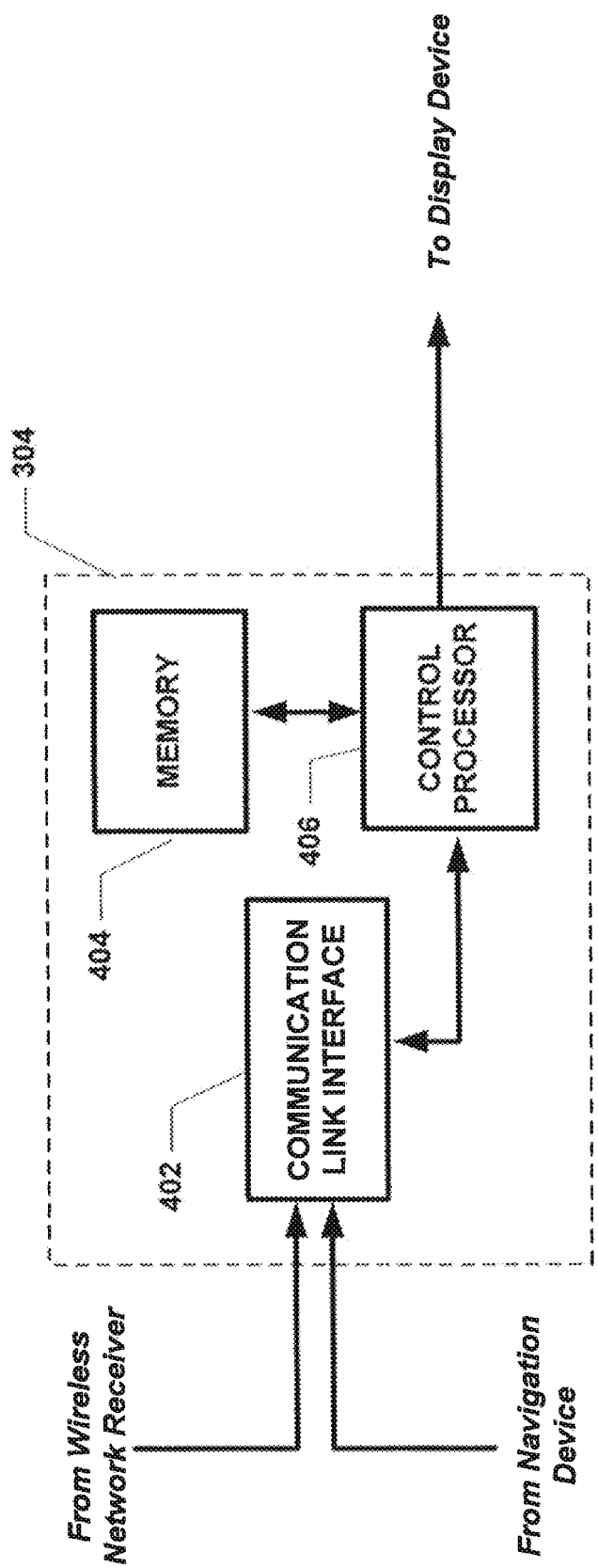
FIG. 4 is a functional diagram of a matrix decoder according to an embodiment of the present invention.

An illustration of an exemplary system for implementing matrix decoder 304 is provided at FIG. 4 where matrix decoder comprises a communication interface 402, a control processor 406, and a memory 404. The communication link interface 402 provides an interface from wireless network receiver 302 and navigation device 306 to matrix decoder 304. Matrix messages are provided to the control processor 406 which includes the control logic for operation of the matrix decoder 304. Briefly stated, the control processor 406 processes the matrix messages by parsing the message data structure and making logical determinations as to the types of alert indications to be provided to the subscriber via display 308. Control processor 406 preferably includes control logic for discriminating between matrix messages to ensure that the remote system 15 only responds to messages containing alert information relevant to the remote system 15. As described in greater detail below, this may include comparing the cell identification within the matrix message with position information received from navigation device 306.

Display device 308 provides means by which to convey the site specific weather information in the storm profile to the end user. Display device 308 may include a speaker device for providing audio indication of weather information in the form of distinctive sounds or prerecorded audio messages. In addition, display device 308 may include visual means such as a display panel for providing weather information in the form of textual information or color-coded lights. Such display panel may be implemented to display electronic graphic images with an Liquid Crystal Display (LCD) screen, Light Emitting Diode (LED), cathode ray tube (CRT) or the like.

Remote system 15 may be a unitary device, or, in the alternative, may be implemented in a non-unitary arrangement of separate components. For example, a vehicle equipped with a satellite radio receiver and a GPS device may be later equipped with a matrix decoder and associated display device. In such case, matrix decoder 304 could be achieved using a handheld computer, which includes a display, or the like. In another version, matrix decoder 304 could be a suitably configured wireless telephone. Display device may be included with the wireless telephone, or may be a separate component with which the wireless telephone communicates. It would be understood by those skilled in the relevant arts that if remote system 15 is a unitary structure, some elements, for example, communication link interface 402 could be eliminated as wireless receiver, navigation device and matrix decoder may be controlled by a common control processor, or processors.

As discussed above, the matrix data is communicated to remote systems in the form of matrix messages. A message may include data for the entire matrix; however, a single message is preferably transmitted encoding only portions of the matrix data, for example, the values for a single row of cells. In one exemplary embodiment, messages are transmitted in a 32 bit format for each row of cells. This is done to minimize the effects of lost or corrupted data. For example, if the system transmits the whole matrix as a single message, and the remote system receives all but one byte, the remote system has no way of knowing what that byte was, or even which byte was lost. All it knows is that it did not receive all of the transmitted data. Therefore, the whole matrix message must be discarded. Transmitting matrix values in separate messages, a loss of one byte results only in that message being lost, not the entire matrix. Messages are also preferably repeated periodically, even when the matrix cell values remain the same, for a number of times to increase the likelihood that remote systems receive all the data relevant to the geographic area in which the remote system is traveling to further minimize the effect of missing data.

A secondary benefit of transmitting matrix values as separate row (or column) messages, is that the remote systems only need enough memory and processing capability to decode a single row, reducing hardware and software costs. Preferably, remote system 15 memory is also enough to cache a number of nearby cell values as well for cells to which the vehicle might reasonably travel within an update cycle, or the period with which updated matrix messages are transmitted. Obviously, in those embodiments where the matrix is ordered according to a columns, the messages may represent individual columns of cells.

In addition to sending matrix messages for individual rows, matrix messages may be sent according to a predefined category of messages. For example, one category of matrix messages could be storm messages which would include information about storms, such as warnings and locations. Categories could also be based upon types of meteorological phenomena.

The remote system 15 matrix decoder 304 is asynchronous with the transmission of the matrix message. Therefore, matrix decoder may only receive a partial message. There also may be corrupted data, or interference. Preferably, the system includes communication protocols that allows matrix decoder to identify the beginning of matrix messages.

In one version, the protocol may include the use of a special reserve character to indicate the beginning of a message. When this character is read, the matrix decoder is configured to perform certain functions depending upon the next byte received after the special character. A problem may occur when the reserve character occurs elsewhere in the matrix message. A typical solution would be to cause the decoder to "escape" the character, but this adds to the size of the message for each instance in which a character is escaped. To avoid the incurrence of wasted bandwidth because of the increased size of the message, when the special reserve character happens to occur elsewhere in the message, it is replaced by replacement character. The replacement character is ideally a character that does not occur in the outgoing message and is dynamically determined for each row matrix message. It is identified in the message in the second message byte. So if the special reserve character occurs elsewhere in the message, matrix decoder replaces that character with the replacement character.

Figures 6, 7:
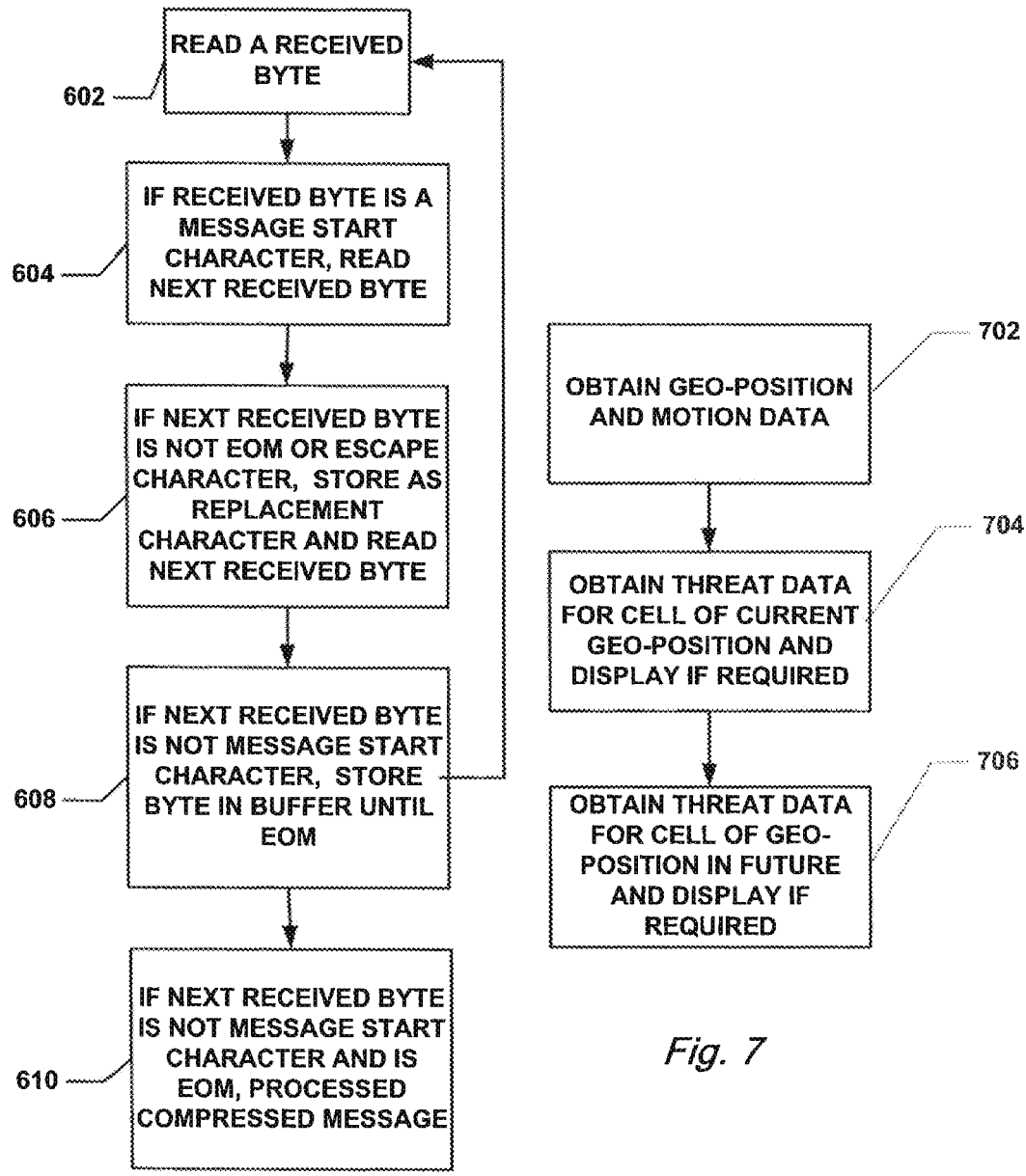
FIG. 6 is a flowchart illustrating an exemplary method used by the remote system decoder to initiate decoding of a matrix message.
FIG. 7 is a flowchart illustrating an exemplary method used by the remote system decoder to decode a matrix message.

FIG. 6 is a flowchart of one process that matrix decoder 304 may use to initiate decoding of the message. Matrix decoder receives and reads a byte 602. Matrix decoder control logic determines if the byte is a message start character, and if so, the next message byte is read 604. It should be understood that if the byte is not a message start character, the step 604 is performed again until a message start character is read. Next, matrix decoder control logic determines whether the next byte is an end of message (EOM) or an escape character 606, if so the next byte is stored as the replacement character to be used if the reserve character occurs in the message. The next byte is read and as long as it is not a message start, or EOM, the byte is stored in a buffer for later processing 608. When a byte is determined to be the EOM, the message is processed 610.

Because of the size of the row, some form of compression may be desired. For example, a run length compression technique, as would be appreciated by those skilled in the art. Once the process described with reference to FIG. 6 is performed and EOM is received, the message stored in the buffer are extracted and decompressed for processing. Additionally, to process messages only relevant to the cells in which the remote system is, or near. The first byte of the matrix message, therefore, could be the row, or latitude coordinate corresponding to the row. If the byte indicating the row indicates a row near the remote system current geo-position latitude, then the remainder of the message is processed. Subsequently, the columns relevant to the location of the remote system are read. The data from the relevant cells are stored.

FIG. 7 illustrates the method matrix decoder uses to perform threat monitoring and alert functions. Matrix decoder obtains geo-position and motion data, including speed and heading, from the navigation device 702. It should be noted that the remote system 15 could be configured such that system speed is obtained from the vehicle speed sensing system in an alternative embodiment. Next, the threat data for the cell corresponding to the current position of the remote system, and an appropriate alert is displayed, if required 704. Displayed alerts include both aural and visual alerts. Then, if a cell or cells may affect the remote system at some time in the future, an appropriate alert is displayed 706. Future time may be any amount of time in the future, encompassing the cells in which the remote system may be at that time in the future, based upon its motion (heading and speed). Because vehicles tend to change heading, the predicted future time, and thus distance, may be an area in which the vehicle may be at that future time.

For example, and with reference to FIG. 8, as remote system 15 travels, its speed and heading are obtained by the matrix decoder 304. The remote system computer is configured with software to calculate a directional margin of some δ and apply it to either side of the heading 801 is computed, resulting in an overall angular margin of 2δ 803. One or more future time (or distance) lines 807a, b, are computed based upon the remote system's speed. For example, the nearest line 807a may be the predicted distance the remote system will travel in 5 minutes, and the distal line may be the distance the remote system will travel in ten minutes. Any time differential may be used, and any number of future time lines may be computed. The result is a "fan-like" area 806 that encompasses some geographic area. The fan-like area 806 is overlaid upon the matrix cells 810, 811 and the remote system determines which matrix cells the "fan" 806 intersects, shown as shaded. These cells are then presumed to be relevant to the remote user. The data associated with each of those cells are processed and, if necessary, according to the estimated time in the future that the remote system might enter a particular cell.

It should be noted that the systems and methods described above may incorporate a remote system that is non-mobile as well. For example, the remote system disclosed in co-owned U.S. Pat. No. 6,493,633, which is incorporated by reference herein, discloses a system for real-time distribution of site-specific weather information, and in particular, a receiving device for receiving the weather information that is intended for installation in a building or other fixed structure. The receiving device is preprogrammed with a location identifier for its position. In this way, it will be able to determine the relevancy of indicator data received by it from the distribution network according to the principles disclosed above.

Some the components of the above-described system may be implemented with computers. A computer may be any microprocessor or processor (hereinafter referred to as processor) controlled device, such as, by way of example, personal computers, workstations, servers, clients, mini-computers, main-frame computers, laptop computers, a network of one or more computers, mobile computers, portable computers, handheld computers, palm top computers, set top boxes for a TV, interactive televisions, interactive kiosks, personal digital assistants, interactive wireless devices, mobile browsers, or any combination thereof. The computer may possess input devices such as, by way of example, a keyboard, a keypad, a mouse, a microphone, or a touch screen, and output devices such as a computer screen, printer, or a speaker.

The computer may be a uniprocessor or multiprocessor machine. Additionally, the computer includes memory such as a memory storage device or an addressable storage medium. The memory storage device and addressable storage medium may be in forms such as, by way of example, a random access memory (RAM), a static random access memory (SRAM), a dynamic random access memory (DRAM), an electronically erasable programmable read-only memory (EEPROM), a programmable read-only memory (PROM), an erasable programmable read-only memory (EPROM), hard disks, floppy disks, laser disk players, digital video disks, compact disks, video tapes, audio tapes, magnetic recording tracks, electronic networks, and other devices or technologies to transmit or store electronic content such as programs and data.

The computer executes an appropriate operating system such as Linux, Unix, Microsoft® Windows® 95, Microsoft® Windows® 98, Microsoft® Windows® NT, Apple® MacOS®, IBM® OS/2®, and Palm® OS, and embedded operating systems such as Windows® CE or and the like. The computer may advantageously be equipped with a network communication device such as a network interface card, a modem, or other network connection device suitable for connecting to one or more networks.

The computer, and the computer memory, may advantageously contain control logic, or program logic, or other substrate configuration representing data and instructions, which cause the computer to operate in a specific and predefined manner as, described herein. In particular, the computer programs, when executed, enable a control processor to perform and/or cause the performance of features of the present invention. The control logic may advantageously be implemented as one or more modules. The modules may advantageously be configured to reside on the computer memory and execute on the one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and the like.

The control logic conventionally includes the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art to effectively convey teachings and discoveries to others skilled in the art.

The control logic is generally considered to be a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should be understood that manipulations within the computer are often referred to in terms of adding, comparing, moving, searching, or the like, which are often associated with manual operations performed by a human operator. It is to be understood that no involvement of the human operator may be necessary, or even desirable. The operations described herein are machine operations performed in conjunction with the human operator or user that interacts with the computer or computers.

It should also be understood that the programs, modules, processes, methods, and the like, described herein are but an exemplary implementation and are not related, or limited, to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hard-wired logic or programs stored in nonvolatile memory, such as, by way of example, read-only memory (ROM).

In some embodiments, features of the present invention can be implemented primarily in hardware using, for example, hardware components such as application specific integrated circuits (ASICs) or field-programmable gated arrays (FPGAs). Implementation of the hardware state machine so as to perform the functions described herein will be apparent to persons skilled in the relevant art(s). In yet another embodiment, features of the invention can be implemented using a combination of both hardware and software.

The computer used to implement the remote system, or the elements thereof, may be an embedded microprocessor. For example, a car radio or dashboard navigation or entertainment system could also comprise an embedded microprocessor configured with control logic as described above to execute the functions of the remote system. The output/display system could then be the radio or entertainment system speakers, or the navigation system visual display. Control of the remote system may be achieved by making the radio or navigation system buttons multipurpose.

As described above and shown in the associated drawings, the present invention comprises an apparatus for a system for providing weather and road condition alerts to vehicles and related method. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. A method of reporting environmental condition information to a remote vehicle comprising:
    a. assigning a plurality of indicator values to a plurality of geographic cells to create a threat data matrix, wherein the indicator values are indicative of certain environmental conditions;
    b. transmitting a threat data message having at least a portion of the threat data matrix to the remote vehicle; and
    c. locally processing, at the remote vehicle, the received threat data matrix to determine the type of alert indications to be provided to a user.

2. The method of claim 1, wherein the weather data message includes the geographic position of the geographic cells.

3. The method of claim 2 wherein the geographic position of the geographic cells is associated with geographic location of the corners of the geographic cells.

4. The method of claim 2 further comprising the step of receiving the vehicle's geographic position from a navigational positioning system and wherein the local processing at the remote vehicle includes comparing the geographic position of the geographic cells with the vehicle geographic position received from the navigational positioning system.

5. The method of claim 1 wherein the threat data message indicates a road condition of at least one road in the plurality of geographic cells.

6. The method of claim 1 wherein the threat data message indicates a characteristic of a weather event, said characteristic being at least one of form, duration, or intensity.

7. The method of claim 1 wherein each environmental condition has an assigned indicator value, and each environmental condition represented in the threat data matrix transmitted in the threat data message has an associated indicator value.

8. The method of claim 1 wherein the threat data message includes indicator values associated with a single geographic cell.

9. The method of claim 1 wherein the threat data message includes indicator values associated with a plurality of geographic cells.

10. The method of claim 1 further including the step of prioritizing the reporting of environmental conditions to a user.

11. The method of claim 1 further comprising the step of locally storing indicator values for the geographic cells in close proximity to the location of the vehicle.

12. A method for providing environmental information to a remote mobile system comprising:
    a. receiving environmental data;
    b. processing the environmental data to associate the environmental data with a plurality of geographic grid cells;
    c. assigning indicator values to the plurality of geographic grid cells to represent the environmental conditions of that cell to create an environmental condition matrix; and
    d. outputting at least a portion of the environmental condition matrix to a distribution network for distribution to the remote mobile system for local processing to determine relevant environmental conditions based upon the remote mobile system's location.

13. The method of claim 12 wherein each environmental condition has an assigned indicator value and each environmental condition represented in the outputted portion of the environmental condition matrix has an associated indicator value.

14. The method of claim 12 wherein the remote mobile system is further configured to receive the remote mobile system's geographic position from a navigational positioning system and wherein the local processing includes comparing the geographic position of the grid cells with the remote mobile system's geographic position.

15. The method of claim 12 wherein the outputted environmental condition matrix includes indicator values associated with a single grid cell.

16. The method of claim 12 wherein the outputted environmental condition matrix includes indicator values associated with a plurality of grid cells.

17. An apparatus for communicating weather related information comprising:
   a. a receiver for receiving matrixed weather related data for a plurality of geographic grid cells at the vehicle, wherein each of the geographic grid cells is assigned a value indicative of the weather related data; and
   b. a processor at the vehicle that receives vehicle location data and locally determines the reportable weather data from the matrixed weather data associated with received vehicle location.

18. The apparatus of claim 17 wherein the received matrixed weather data is associated with a single geographic cell.

19. The apparatus of claim 17 further comprising memory for storing values indicative of weather related data for the plurality of grid cells in close proximity to the location of the vehicle.

20. The apparatus of claim 17 wherein the received matrixed weather related data includes the geographic position of the geographic grid cells.

* * * * *